United States Patent [19]
Geissler

[11] Patent Number: 5,632,819
[45] Date of Patent: May 27, 1997

[54] HIGH PRESSURE CHEMICAL SEED TREATER

[76] Inventor: Robert G. Geissler, P.O. Box 841, Davenport, Wash. 99122

[21] Appl. No.: 535,969

[22] Filed: Sep. 29, 1995

[51] Int. Cl.⁶ .................................................. B05C 5/00
[52] U.S. Cl. ................ 118/712; 118/13; 118/24; 118/603; 118/610; 118/303; 118/314; 118/316; 47/1.5
[58] Field of Search .............................. 118/712, 13, 24, 118/27, 29, 603, 610, 303, 314, 316; 47/1.5, 57.6, DIG. 9

[56] References Cited

U.S. PATENT DOCUMENTS

| | | |
|---|---|---|
| 3,848,772 | 11/1974 | Aanestad et al. |
| 3,976,030 | 8/1976 | Ragsdale et al. ............ 118/303 |
| 4,023,525 | 5/1977 | Weber ............................ 118/303 |
| 4,079,696 | 3/1978 | Weber ............................ 118/417 |
| 4,188,751 | 2/1980 | Saruwatari . |
| 4,275,682 | 6/1981 | Weber ............................ 118/303 |
| 4,302,670 | 11/1981 | Zaderej . |
| 4,356,934 | 11/1982 | Knake ............................... 47/1.5 |
| 4,465,016 | 8/1984 | Weber ............................ 118/303 |
| 4,503,803 | 3/1985 | Barnes ........................... 118/303 |
| 4,895,106 | 1/1990 | Barnes ........................... 118/684 |
| 5,447,565 | 9/1995 | Song et al. ..................... 118/303 |

Primary Examiner—Laura Edwards

[57] ABSTRACT

An assembly for a seed treating device incorporating a high volume, downwardly tapered hopper with metering gates and a series of high pressure chemical nozzles which laterally introduce a measured chemical treatment to the flow of falling grain or seed inside a spray chamber. A series of valves control the flow of chemicals through the apparatus while sump pump gathers and recirculates excess chemicals from inside the spray chamber for reuse or disposal. The spray chamber exit can be closed with a water tight seal and the system flushed with water and filtered for purposes of cleansing.

7 Claims, 1 Drawing Sheet

HIGH PRESSURE CHEMICAL SEED TREATER

FIELD OF THE INVENTION

The present invention relates to agricultural devices used to apply a chemical film to the surface of grains and seeds, commonly known as "seed treaters." The present invention relates more particularly to seed treaters employing a high-pressure, lateral chemical spray for application.

BACKGROUND

Seed treating devices are commonly utilized by groin growers to coat the surface of grain or seed with chemicals, such as fertilizer or hormone, prior to planting.

Seed treaters known in the prior art generally entail the use of a hopper in which the seeds are tumbled or otherwise mixed to coat.

In use, the chemically treated seeds remain in the hopper until conveyed to a vehicle for subsequent transfer to the field.

BACKGROUND: PRIOR ART

Seed treating devices are well known in the prior art. The following U.S. patents are illustrative of the state of the an in the field of the invention:

Barnes, No. 4,895,106, Jan. 23, 1990, Seed Treater and Conveying Apparatus. The most recent Barnes invention includes an elongated auger unit on which a liquid chemical applicator tank is mounted for treating seeds as they are conveyed through the auger tube. The auger includes a central shaft with a brush flighting and is pivotally supported for adjusting the position of the discharge end without moving the vehicle on which it is mounted.

Barnes, No. 4,503,803, Mar. 12, 1985, Seed Treater and Conveying Apparatus. The first Barnes patent also discloses an elongated auger unit on which a chemical applicator tank is mounted for treating seeds as they are conveyed through the auger lube. The auger includes a brush flighting and is pivotally supported for adjusting the position of the discharge end without moving the vehicle on which it is mounted. In one embodiment, the auger unit is mounted on a slide track so as to be both longitudinally and pivotally movable. The second embodiment discloses an auger unit removable from the seed hopper.

Weber, No. 4,465,016, Aug. 14, 1984, Metering Device for Liquid Treatments. The fourth Weber machine features a disc-like rotor sandwiched between stationary discs or headers. A rotary disc has a multiplicity of measuring chambers extending endways through its thickness. The stationary, discs have supply and recirculation manifold grooves opposite each other and confronting the measuring chambers of the revolving disc, as well as inlet and outlet ports. The stationary discs or headers also have discharge and relief manifold grooves opposite each other. The housing returns soiled and other quantities of liquid chemical treatment to be used for flushing the reservoir for reuse.

Zaderej, No. 4,302,670, Nov. 24, 1981, Electronic Seed Treater. Seeds are first coated with a mixture of water and enzyme and then subjected to a series of electrical potentials that cause water, ion particles, and nitrogen components to be impregnated.

Weber, No. 4,275,682, Jun. 30, 1981, Peanut Seed Treating Machine. The third Weber machine includes a supply bin with a hopper bottom, a peanut distributing conical plate, a high speed rotor with upper and lower discs from which liquid chemical treatment is emitted, where the upper disc has a larger diameter than the lower disc and flutes which are substantially deeper in an axial direction than the lower disc. The upper disc has holes near its inner periphery.

Saruwatari, No. 4,188,751, Feb. 19, 1980, Magnetic Seed Treating Device. The Saruwatari device reveals a seed treater having a tubular member with an internal support securing a magnet therein. The seeds are treated by flowing over said magnet.

Weber, No. 4,079,696, Mar. 21, 1978, Apparatus for Treating Seeds With a Liquid. The second Weber apparatus shows a receiving chamber for receiving particles and liquid and a means for conveying consecutive batches of particles and liquid to the chamber. Liquid is metered in batches through a liquid metering means. The metering means is responsive to the conveyance of batches of particles to the receiving chamber and cycles the container between a dip position and a dump position. The apparatus may also include an auger for conveying particles and liquid from the receiving chamber with concurrent intimate mixing.

Weber, No. 4,023,525, May 17, 1977, Seed Treater. The first Weber invention discloses a seed treating and conveying apparatus including a screw conveyor with an auger. A motor-driven auger shaft operates within the auger tube.

Ragsdale, et al., No. 3,976,030, Aug. 24, 1976, Portable Pressure Spray Liquid Seed Treater. The Ragsdale invention consists of three main parts: a hopper, a gate assembly, and a set of horizontally disposed spray nozzles. The apparatus is enclosed by a frame and designed to be portable.

Aanestad et al., No. 3,848,772, Nov. 19, 1974, Seed and Soil Treatment Device. The Aanestad device proposes a plurality of dispersion cups in a fixed relationship to seed receivers in a seed box. The chemical for treatment is conveyed pneumatically through a hollow rotating tube to the dispersion cups where a predetermined quantity of chemical is ejected from the dispersion cups either onto the seed or onto the soil.

The aforementioned devices for applying a chemical film to the surface of grain or seed perform the task for which designed but are deficient in a number of respects.

The prior art do not process grain quickly, resulting in longer operating hours and increased costs.

In addition, the design of prior art is such that the brain for treatment is subject to damage and breakage during processing. The prior art generally wets the grain with a desired chemical in a bin of sorts while tumbling or forcing it through some aspect of the apparatus to better ensure coating. Such methods cause the wet grain to stick to the inside of the apparatus or become lodged in crevices where the grain is vulnerable to damage. This phenomena is particularly common when the chemicals to be applied are viscous such as those with a polymer base and when the treated seeds are light in weight. Further, the mechanical agitation or conveyance of the commodity against steel surfaces which necessarily takes place as a result of treating seeds with the prior art can result in "bruised" seed lots and reduced or irregular yields.

When the twain is stuck or lodged inside the treatment apparatus, not only is the brain subject to damage but efficiency is also reduced and cleansing required to restore full performance. However, the prior art is difficult and time-consuming to clean.

The prior art are not equipped to facilitate cleansing with any special features; therefore, cleansing is usually performed manually with a water hose and brush requiring the operator to physically enter the apparatus. It follows that cleansing prior art seed treaters generally requires operator exposure to potentially harmful chemicals and dust.

Many agricultural chemicals used in seed treaters are recognized as hazardous. Cleansing the prior art seed treaters in the manner described not only involves a risk of exposure to humans but usually involves the release of such chemicals into surrounding soil in violation of environmental protection regulations.

Absent frequent cleaning, the dust that accumulates inside the prior art treatment chambers tends to form clumps which inhibit efficiency in coating the grain. These dust clumps can prevent complete coating of the seed resulting in irregularities in the field and lower yields.

Frequent cleansing is also required to avoid cross-contamination between different seed lots and species types as well as to avoid potentially dangerous chemical mixtures.

Efficiency in grain saturation or coverage is compromised inherently by the design of some prior art seed treaters. Reduced efficiency is often a factor of the method used to coat the seeds whether by spray nozzles or agitation in a hopper or due to the lack of a method for accurately measuring the grain and chemicals to be used. Incomplete chemical coverage is particularly common in the prior art when operating al increased rates.

In addition to lower or detective yields, impaired seed treater efficiency often results in left-over chemicals, not used in the treatment process. Such chemicals are often classified as hazardous waste and therefore require proper disposal.

Because the prior art are difficult to clean and do not possess a means for flushing the system of chemicals, the prior art are not designed for "prescription-style" seed treating. Prescription-style seed treating is a trend in the agricultural industry resulting from the expanded variety of chemicals now available for application.

Prescription-style seed treating involves the application of two or more different chemicals to the same seed to achieve a customized result. Prior art seed treaters are not designed to apply a number of different chemicals to the same batch of grain because the seed treater must be cleaned between each use and chemicals from the previous treatment flushed from the system before a second treatment with a different chemical. Such cleansing and flushing of the system is required to avoid problems associated with residual chemical contamination.

Seed treaters known in the prior art generally involve storage of treated grain in the apparatus until removal for use. Prolonged storage of chemically treated grain is not desirable for a number of reasons. Primarily, exposure to chemically treated grain may pose a health risk to workers in the area. Storage of treated grain also poses the threat of accidental introduction into grain supplies intended for consumption.

In addition, grain can become "non-viable" if it is allowed to set for prolonged periods after chemical treatment, especially if the grain surface has been scratched or cracked during processing. Prolonged storage of seed can also result in unintended commencement of germination, thereby eliminating productive use.

When chemically treated seeds are not suitable for planting, they are essentially no more than hazardous waste requiring proper disposal.

SUMMARY OF THE INVENTION

In view of the foregoing disadvantages inherent in the known types of seed treating devices now present in the prior art, the present invention provides a seed treating apparatus wherein the same utilizes a variety of specific structural advantages to overcome the inadequacies of the prior art.

The present invention for an improved chemical seed treater is capable of processing grain more quickly than those of the prior art by virtue of the invention's high-volume capacity.

The present design is such that the grain for treatment is subject to a reduced risk of damage and breakage during processing. While the prior art generally wets the grain with a desired chemical before directing the grain through some aspect of the apparatus, the grain treated by the subject invention does not contact any portion of the apparatus once coated.

This method reduces the incidence of grain sticking or lodging inside of the apparatus, thereby mitigating grain damage and minimizing the need for internal cleansing. As a result, the present invention is particularly well adapted to applying highly viscous chemicals such as those with a polymer base and to treating light weight grains which are more susceptible to sticking and lodging. Mechanical agitation or conveyance of the commodity against steel or other hard surfaces, which can result in "bruised" seed lots and reduced or irregular yields, is minimized by the disclosed invention. As will be more apparent from the description and drawing that follows, when the seed for treatment is conveyed through the apparatus, only initial quantities contact the rigid surfaces of the device. All other seed falls upon itself, thereby reducing the risk of bruising damage.

The present invention is more easily and safely cleaned than those contemplated by the prior art. The present invention does not require traditional manual cleansing which can pose a hazard to the health of workers and to the environment. Rather, the subject seed treater discloses a method for "self-cleaning" which collects and filters rinse water for reuse.

The present invention's self-cleaning capacity helps reduce dust accumulation to better ensure complete coating of the seed. In addition, as a result of this facilitated cleansing method, the present invention is better capable of avoiding cross-contamination between different seed lots and species types as well as potentially dangerous chemical mixtures.

The subject invention discloses a seed treater that helps to ensure efficient and accurate grain coverage. To accomplish these ends the present invention features lateral spray nozzles for thorough chemical application and methods for accurately measuring the grain and chemicals to be applied.

The subject seed treater is designed to maintain efficient operation and consistent grain coverage, even at high rates of operation, thereby providing increased and consistent yields, as well as reducing the occurrence of unused chemicals post-treatment.

Unlike the prior art, the present seed treater is specially designed to perform "prescription-style" seed treating. Because the present invention can be cleaned and the system flushed of chemicals quickly and easily, the subject seed treater facilitates the application of a number of different chemicals to the same batch of grain.

The present seed treater eliminates problems associated with storing chemically treated grain by allowing the operator to treat only the amount of grain required for immediate use. Any grain stored in the subject seed treater is not exposed to chemicals and is therefore safe for storage or disposal.

The present invention is simple in design and composed of common, inexpensive materials; it is, therefore, conducive to a low cost of manufacture and sale to the consuming public. The subject seed treating device is also designed such that parts are easily and inexpensively repaired or replaced for longer and more economical use.

The present invention is relatively compact in size and is designed to be of durable and reliable construction.

As such, the general purpose of the present invention, which will be described subsequently in greater detail, is to provide a new and improved seed treating apparatus which has all the advantages of the prior art and none of the disadvantages.

To attain this, the present invention provides a seed treating apparatus including a high-volume hopper with adjustable metering gates and a spray chamber wherein a series of high pressure nozzles are situated such that the grain is encountered laterally by chemical spray from the nozzles only after the brain leaves the hopper.

The present invention also provides a spray chamber, the bottom of which is convex in shape with a water-tight gate on an exit aperture located at the high point of the chamber bottom.

The present invention further provides a sump pump which collects excess fluid from the bottom of the spray chamber for filtration and recirculation while a series of fluid valves regulates the flow of liquid through the apparatus.

The present invention contemplates the presence of a metering device on the line supplying fluid to the apparatus for purposes of ensuring proper saturation.

Air cylinders or similar controls effect opening and closure of all gates disclosed as part of the apparatus.

The invention resides not in any one of these features, per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

OBJECTS AND ADVANTAGES

It is therefore an object of the present invention to provide a new and improved seed treating apparatus which has all the advantages of the prior art seed treaters and none of the disadvantages.

It is also an object of the present invention to provide a new and improved seed treating apparatus which features a high-volume hopper with metering gates for increased processing speed.

It is another object of the present invention to provide a new and improved seed treating apparatus which reduces the incidence of grain damage, "bruising," and breakage.

It is still another object of the present invention to provide a new and improved seed treating apparatus that is easily and safely cleaned.

It is yet another object of the present invention to provide a new and improved seed treating apparatus that reduces cross contamination between seed lots and species types, as well as cross contamination of chemicals used for treatment.

It is a further object of the present invention to provide a new and improved seed treating apparatus that is efficient in its application of chemicals and provides consistent coverage.

It is yet a further object of the present invention to provide a new and improved seed treating apparatus that is conducive to prescription-style seed treatment.

It is still another object of the present invention to provide a new and improved seed treating apparatus that eliminates the need to store treated grain in the apparatus until use or disposal.

It is yet another object of the present invention to provide a new and improved seed treating apparatus that minimizes the generation of hazardous waste.

It is a further object of the present invention to provide a new and improved seed treating apparatus which may be easily and efficiently manufactured and marketed.

A still further object of the present invention is to provide a new and improved seed treating apparatus of durable and reliable construction, with component parts susceptible to simple and economical repair or replacement.

Yet a further object of the present invention is to provide a new and improved seed treating apparatus susceptible of a low cost of manufacture with regard to both materials and labor, and which accordingly is then susceptible of a low price of sale to the consuming public, thereby making such seed treating apparatus economically available to the buying public.

One further object of the present invention is to provide a new and improved seed treating apparatus that is relatively compact in size.

There, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Other objects and advantages of the present invention will become more readily apparent after considering the following drawings and description.

| REFERENCE NUMERALS IN DRAWINGS. | | | |
|---|---|---|---|
| 2 | Seed or grain | 16 | Air cylinder control |
| 4 | Hopper | 18 | Sump pump |
| 6 | Main gate | 20 | Hollow member (recirculation line) |
| 8 | Main gate air cylinder control | 20a | Fluid filter |
| 10 | Gate assembly | 22 | Fluid spray nozzles |
| 10a | Hinged flange | 24 | Hollow member (nozzle to valve line) |
| 10b | Manual adjustment knobs | 26 | Fluid control valve |
| 10c | Metering device | 28 | Fluid control valve |
| 12 | Spray chamber | 30 | Fluid control valve |
| 14 | Exit aperture | 32 | Hollow member (supply line) |
| 14a | Exit aperture door | 32a | Metering device on supply line |
| 14b | Exit door lock | 34 | Hollow member (bypass line) |
| 14c | Air cylinder control | 36 | Rollers |
| | | 38 | Storage Tank |

DESCRIPTION OF THE DRAWINGS

The various objects, advantages, and novel features of the invention will be more readily understood from the following detailed description, in which like reference characters refer to like parts, and in which.

DETAILED DESCRIPTION OF PREFERRED EMBODIMENT

Embodiment of FIG. 1

Figure 1:
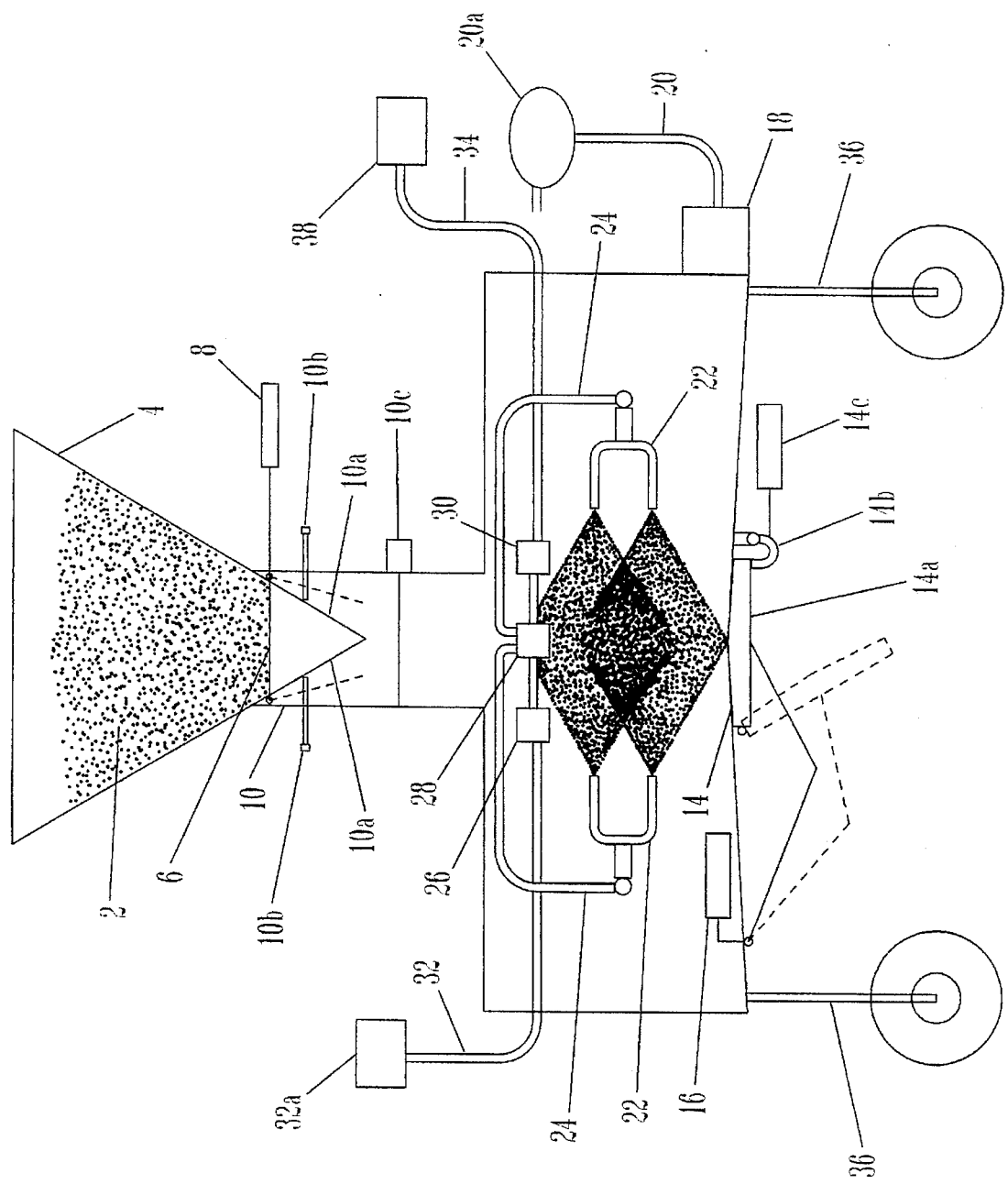
FIG. 1 is a side view of the preferred embodiment of the invention shown with main gate and exit aperture in closed positions.

A high volume, downwardly tapered hopper 4 is open at both ends with a main gate 6 at the base thereof. The main gate 6 is operated by way of an air cylindar control 8.

The hopper 4 is positioned above an adjustable, hinge-type gate assembly 8 comprising a set of hinged flange members 10a, free ends toward ground, with manual adjustment knobs 10b engaged therewith. In one version of the preferred embodiment, the gate assembly is equipped with a metering device 10c for measuring the grain or seed.

The gate assembly 10, opens into a spray chamber 12, the bottom of which is convex and possesses an exit aperture 14 at its highest point. The exit aperture 14 is sealed by way of a water-tight hinged, door 14a. In the preferred embodiment, the exit aperture door 14a is closed by way of an air cylindar control 16 and secured by another air cylinder control 14c and lock 14b.

A sump pump 18 is situated on the exterior of the spray chamber 12, and communicates with an interior bottom edge of the spray chamber 12 such that excess fluid accumulated in the bottom of the spray chamber 12 can be collected by the pump 18.

A hollow member 20 connects the pump 16 to a fluid source or a holding tank (not shown) and serves as the fluid recirculation line. In one version of the preferred embodiment, a filter 20a is connected to the recirculation line 20 such that fluid passing therethrough is cleansed.

A series of horizontally disposed high-pressure fluid spray nozzles 22 are present in the spray chamber 12 such that the emissions therefrom are opposed to one another and toward the midline of the chamber 12.

Hollow member 24 connects the spray nozzles 22 with fluid control valves 26, 28, and 30, which regulate the flow of liquids through the invention.

Hollow member 32 is the supply line carrying liquid from an external source (not shown) to the fluid control valves 26, 28, and 30. In the preferred embodiment, the supply line 32 is equipped with a metering device 32a for measuring the fluid passing therein.

Hollow member 34 is the bypass line, allowing liquid to pass from the hollow member supply line 32 through the control valves 26, 28, 30 to a storage tank 38, without said liquid reaching the spray nozzles 22.

In one version of the preferred embodiment, wheels or track rollers or means for moving 36 the entire apparatus are present al the base of the invention.

OPERATION

In actual operation, grain or seed 2 is placed in the hopper 4, usually from an overhead bin (not shown). The seed can be stored in the hopper 4 if the main gate 6 is closed by way of the associated air cylindar control 8. When the main gate 6 is opened, the seed 2 flows, by gravitational force, into the gate assembly 10.

The volume of seed 2 flowing from the hopper 4 is regulated by the gate assembly 10. When the gate adjustment knobs 10b are adjusted, the distance between the free ends of the hinged flange 10a members is altered, thereby varying the amount of seed 2 allowed to flow from the hopper 4.

When seeds are treated in the disclosed apparatus, a chemical is pumped from a remote source through the hollow member supply line 24 and valves 26, 28, and 30 to the spray nozzles 22. As the seed 2 falls from the hopper 4 and through the main gate 6 and gate assembly 10, the seed 2 encounters and is coated by the chemical spray generated by said nozzles 22 inside the spray chamber 12.

The flow of seed 2 passes through the spray chamber 12 and out through the exit aperture 14 into the bed of a truck or other vehicle (not shown) for immediate transport and planting.

Excess chemical accumulates in the outer edges of the convex spray chamber 12 bottom. The sump pump 18 collects the accumulated excess chemical from the bottom of the spray chamber 12 for recirculation through hollow member 20 back to the chemical source.

The disclosed apparatus is cleansed by sealing the exit aperture 14 on the spray chamber 12 bottom by way of the water-tight exit aperture door 14a (air cylinder 16 effects closure of the door 14a while door lock 14b and air cylinder control 14c secure the door 14a in place) and recirculating water through the system until completely flushed and the fluid filtered by fluid filter 20a.

Contaminated water or excess chemical can thereby be contained and safely collected for proper disposal with reduced operator exposure to the chemicals for treatment.

I claim:

1. A seed treating device comprising:

a downwardly tapered hopper, open at the top and bottom and having a main gate at a lowermost opening;

a gate assembly positioned below the main gate of the hopper comprising a set of hinged flanges, free ends toward the ground with adjustment knobs and means to vary the distance between the flanges;

a spray chamber positioned below the gate assembly having a substantially convex bottom with a water tight exit aperture at a high point of the convex bottom and sump pump at an outer bottom edge of the spray chamber for collecting accumulated fluid therein;

a hollow member recirculation line connected to said sump pump for allowing fluid to flow from the sump pump to a remote source of fluid;

a hollow member supply line in fluid communication with the remote fluid source on one end and attached to a series of fluid regulation valves mounted or in close proximity to an exterior of the spray chamber at the other end; additional hollow members connected at one end to the fluid regulation valves and at the other end to a series of horizontally disposed high pressure fluid nozzles situated such that the emissions therefrom are opposed to one another and directed toward a midline of the spray chamber; and a hollow member bypass line connected at one end to the fluid regulation valves and at the other end to a storage tank for disposal or recycling of fluid allowed to flow through the bypass line by adjustment of the fluid regulation valves.

2. The device as described in claim 1 and further comprising an air cylinder control on the main gate for effecting opening and closure.

3. The device as described in claim 1 and further comprising an air cylinder control on the water tight spray chamber exit aperture for effecting opening and closure.

4. The device as described in claim 1 and further comprising equipped with means for moving the device.

5. The device as described in claim 1 and further comprising a metering device on the gate assembly for measuring the grain.

6. The device as described in claim 1 and further comprising a metering device on the fluid valves to measure the fluid.

7. The device as described in claim 1 and further comprising a filtering device on the recirculation line to cleanse fluid passing therethrough.

* * * * *